United States Patent
Jin et al.

(10) Patent No.: US 7,707,429 B2
(45) Date of Patent: *Apr. 27, 2010

(54) SYSTEM AND METHOD TO PROACTIVELY DETECT SOFTWARE TAMPERING

(75) Inventors: Hongxia Jin, Cupertino, CA (US); Jeffrey Bruce Lotspiech, Henderson, NV (US)

(73) Assignee: International Business Machines Corporation, Armonk, NY (US)

( * ) Notice: Subject to any disclaimer, the term of this patent is extended or adjusted under 35 U.S.C. 154(b) by 243 days.

This patent is subject to a terminal disclaimer.

(21) Appl. No.: 11/930,425

(22) Filed: Oct. 31, 2007

(65) Prior Publication Data

US 2008/0066178 A1    Mar. 13, 2008

Related U.S. Application Data

(63) Continuation of application No. 10/248,130, filed on Dec. 19, 2002, now Pat. No. 7,305,564.

(51) Int. Cl.
*G06F 21/00* (2006.01)
*H04L 9/00* (2006.01)

(52) U.S. Cl. .......................... 713/188; 726/23; 713/179
(58) Field of Classification Search ........................ None
See application file for complete search history.

(56) References Cited

U.S. PATENT DOCUMENTS

| | | | |
|---|---|---|---|
| 4,757,533 A | 7/1988 | Allen et al. |
| 5,673,316 A | 9/1997 | Auerbach et al. |
| 5,724,425 A | 3/1998 | Chang et al. |
| 5,850,559 A | 12/1998 | Angelo et al. |
| 5,944,821 A | 8/1999 | Angelo |
| 5,978,475 A | 11/1999 | Schneier et al. |
| 5,983,348 A | 11/1999 | Ji |
| 5,996,113 A | 11/1999 | Korn et al. |
| 6,006,328 A | 12/1999 | Drake |
| 6,192,475 B1 | 2/2001 | Wallace |

(Continued)

FOREIGN PATENT DOCUMENTS

EP    1076279 A1    2/2001

(Continued)

OTHER PUBLICATIONS

Bellare et al., "Forward Integrity for Secure Audit Logs," Dept. of Computer Science & Engineering, Univer. of California at San Diego, Nov. 23, 1997, pp. 1-16.

(Continued)

*Primary Examiner*—Christopher A Revak
(74) *Attorney, Agent, or Firm*—IP Authority, LLC; Ramraj Soundararajan

(57) ABSTRACT

Software intrusion is proactively detected using a dynamically evolving audit log wherein log entries are generated in the audit log and key values are evolved based upon a one-way function depending on both the previous log entry and the previous key. The audit log with the generated log entries and the final key value is transmitted to a clearinghouse that detects software intrusion by analyzing these values. In an effort to reduce the size of the log to be transmitted, the log entries are assigned identical values, thereby only needing to transmit one log entry and the last key value to the clearinghouse.

20 Claims, 4 Drawing Sheets

U.S. PATENT DOCUMENTS

| | | | |
|---|---|---|---|
| 6,268,789 B1 | 7/2001 | Diamant et al. | |
| 6,681,331 B1 | 1/2004 | Munson et al. | |
| 6,963,983 B2 | 11/2005 | Munson et al. | |
| 7,096,497 B2 | 8/2006 | Ellison et al. | |
| 7,096,499 B2 | 8/2006 | Munson | |
| 7,185,367 B2 | 2/2007 | Munson | |
| 7,305,564 B2 * | 12/2007 | Jin et al. | 713/188 |
| 2002/0144121 A1 | 10/2002 | Ellison et al. | |

FOREIGN PATENT DOCUMENTS

| | | |
|---|---|---|
| GB | 2366028 A | 2/2002 |
| JP | 2001-236132 | 8/2001 |
| WO | WO 99/04530 A1 | 1/1999 |
| WO | WO 99/13614 | 3/1999 |
| WO | WO 00/77596 B1 | 12/2000 |
| WO | WO 00/77597 A1 | 12/2000 |
| WO | WO 01/14953 A1 | 3/2001 |

OTHER PUBLICATIONS

Ferristal, "AppScan Flags Security Problems in Web Applications," Network Computing, V11, N20, Oct. 16, 2000, pp. 32-34.

Song, "Practical Forward Secure Group Signature Schemes," CCS '01, Nov. 5-8, 2001, Philadelphia, PA, pp. 1-10.

Yee, "Home Sweet Home (bsy's home page)," <http://www.cse-ucsd.edu/users/bsy/>.

* cited by examiner

SYSTEM AND METHOD TO PROACTIVELY DETECT SOFTWARE TAMPERING

RELATED APPLICATIONS

This application is a continuation of U.S. application Ser. No. 10/248,130, filed Dec. 19, 2002, now U.S. Pat. No. 7,305,564.

BACKGROUND OF THE INVENTION

1. Field of Invention

The present invention relates generally to the field of software security. More specifically, the present invention is related to the detection of software tampering.

2. Discussion of Prior Art

With the advent of digital technologies for movies and music, the problem of unauthorized copying has become severe. Digital copies are perfect copies, and to prevent them from being widely redistributed across the Internet, numerous content protection technologies such as DTCP (Digital Transmission Content Protection) and CPRM (Content Protection for Recordable Media) have been developed. These technologies have "robustness terms" in their licenses, wherein the terms in such licenses provide for tamper resistant implementations. The development of tamper-resistant technologies, especially software tamper-resistant technologies, has become a growing industry.

Most intrusion detection mechanisms are used after the damage is done and, thus, are reactive. The term "proactive security" refers to the detection of what goes wrong during a process, such as an execution of software before the final damage is done. Prior art systems fail to provide for a proactive security mechanism to combat reverse-engineering of software. These prior art systems fail to identify evidence hackers leave behind during a reverse-engineering attempt. There is a need to proactively detect (and thereby prevent real damage from occurring by stopping the hacking when it is still in its infancy) an on-going reverse-engineering process before hackers succeed in the tampering and before they gain access to important information such as secret keys.

In general, prior art intrusion detection systems are reactive and use existing knowledge to watch for abnormalities. One way of watching for such abnormalities is by maintaining an "audit log". The general concept of using an auditing log has existed for a long time. However, an "auditing log" scheme works better and more practically when it is applied for a specific "detection" purpose. In this scenario, one needs to identify the information that needs to be put into the log for the detection purpose and the verification process that should follow. Making the information in the log satisfy certain properties can at times not only make the scheme more efficient (in terms of reducing log size and creating a more efficient verification), but can also guarantee the verification process and detect the target anomaly.

Another relevant concept is "forward security" which is a formal property that has been identified and appeared in literatures for security. Forward security includes methods of preventing corruption of past code or logs after tampering has occurred. Future actions may be untrusted, but preexisting trusted items remain uncompromised.

The following references provide for a general description of reactive intrusion detection mechanisms.

The U.S. patent to Drake (U.S. Pat. No. 6,006,328) discloses a method for computer software authentication, protection, and security. The method involves replacing vulnerable code (e.g., vulnerable to eavesdropping) with equivalent code (with vulnerability removed) that communicates directly with hardware, and it disables system interrupts or other functions which would permit rogue software to eavesdrop. Tamper detection techniques are used within, or accessed by, the software to disallow the subsequent entry of ID-data into input routines if tampering is detected. The disclosed invention provides for the: execution of code checksums of RAM or other images; comparison of memory with other stored copies of executable code and/or decryption of the entry process; examination of executable environment; comparison of executable size with expected values; notification and/or transmission of authentication failure details to a third person or process; and recording of a log regarding the usage and/or details of the user (of input routines or secure entry processes).

The U.S. patent to Auerbach et al. (U.S. Pat. No. 5,673,316) provides for the creation and distribution of cryptographic envelopes. Disclosed within is an envelope with an aggregation of information parts wherein each part is encrypted with a part encryption key and a public key. The list is then signed with a secret key to generate a signature, which is also included in the envelope.

The European patent to Pearson (EP1076279-A1) discloses a computer platform with license-related code which is integrity checked with reference to signed versions and public key certificates. The computer platform or trusted module forms a tamper proof component wherein licensing checks can occur within a trusted environment that behaves as a user would expect. An associated clearinghouse mechanism enables registration and payment for data. The system also enables verification of the integrity of a platform by either a local user or a remote entity.

The U.S. patent to Allen et al. (U.S. Pat. No. 4,757,533) discloses a security system for a personal microcomputer which combines hardware and software to provide tamperproof protection of user and file access. One of the disclosed chips provides an audit trail log, protection and encryption system flags, and user access rights, wherein the chip ensures that access is only gained by valid users.

The foreign patents WO200077597 A1, WO200114953 A1, and WO200077596 B1 disclose, generally, a tamper resistance method involving transforming the data flow in the computer software code to dissociate the observable operation of the transformed code from the intent of the original software code. The methods provide for making computer software resistant to tampering and reverse engineering.

The foreign patent to Stanton et al. (WO9904530 A1) discloses a file encryption method with session keys for use as a data encryption key to prevent tampering. The method using a strong encryption algorithm based on a shared secret key or public-private key cryptosystem which enables emergency access to the file by legal authorities.

The non-patent literature to Bellare et al. entitled, "Forward Integrity For Secure Audit Logs" provides a method for maintaining the security of audit logs. Disclosed applications include: securing audit logs (e.g., syslogd data) for intrusion detection or accountability, communications security, and authenticating partial results of computations for mobile agents.

The non-patent literature to Song entitled, "Practical Forward Secure Group Signature Schemes" provides for a forward security scheme to mitigate the damage caused by key exposure.

Whatever the precise merits, features, and advantages of the above cited references, none of them achieve or fulfills the purposes of the present invention.

SUMMARY OF THE INVENTION

The present invention provides for a computer-based system to proactively detecting software intrusion using a dynamically evolving audit log comprising, wherein the system comprises: (a) non-volatile memory storing at least: an audit log comprising a plurality of log entries representing integrity check results based upon software executions and evolving key values based upon a one-way function, wherein the one way function depends on both a previous log entry and a previous key; and (b) a network interface to transmit the audit log with the generated log entries and a final key value to a clearinghouse that detects software intrusion in client side software by analyzing the log entries and the final key value.

A computer-based system to proactively detect software intrusion using a dynamically evolving audit log, wherein the system comprises: (a) computer readable program code executed in a computer to embed integrity checks in software code; (b) non-volatile memory storing at least an audit log comprising computer generated log entries with an identical log entry value and evolving key values based upon a one-way function, wherein the one way function depends on both the identical log entry value and previous key; and (c) a network interface to transmit the identical log entry value and final key value to a clearinghouse that detects software intrusion by analyzing the identical log entry value and final key value.

DESCRIPTION OF THE PREFERRED EMBODIMENTS

Figure 1:
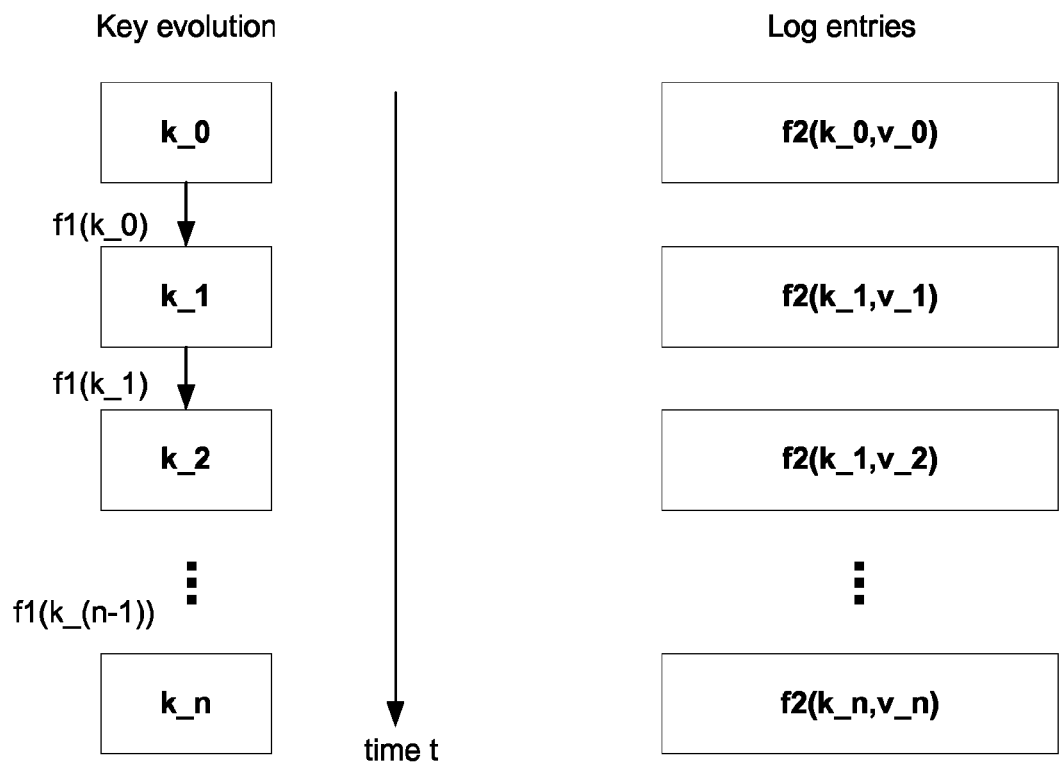
FIG. 1 illustrates a general method wherein the key progression is independent of log entry value.

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

It should be noted that the term "user" as used throughout the specification refers to an operator of an untrusted computer (e.g., set-top box, PC, PDA, video game console, etc.), who could try to tamper with the software code (such as software code related to: web browser program; sound card driver; game console program; Java® applet; or macros embedded in multimedia content such as images, music, or video files) and the log. Additionally, the term "log" refers to an audit trail using a set of entries describing what happens with regard to execution of software code. In one implementation, the entries describe the results of integrity checks embedded in and performed by the software code (e.g., a checksum on a block of code).

The present invention provides for a system and a method that utilizes an audit trail to detect an anomaly. It should be noted that a scenario is envisioned wherein the software runs on the client side (e.g., a hostile user's machine). Thus, the threat comes from the untrusted user himself. Particular attention is given to this type of threat, simply because the hacker cannot only access and tamper with the code, but also can also tamper with the audit trail. Therefore, in this scenario, the trail itself needs to be protected such that there is no way for a hacker to undetectably delete any old entries in the trail. Although, after a while, there is a possibility that the hacker will completely understand the logging mechanism, and from that point on the new entries in the trail cannot be trusted. But, based upon the present invention, the hacker cannot go backwards to modify entries in a log.

The invention described here is a scheme that applies "forward security" property into integrity checks during software execution to proactively detect the software tampering process. Any truncation of the log, deletion of the log, or substitution of an old valid log is easily detected when the user connects to get new content. It is assumed that before the hacker completely understands a specific software program, he will have triggered many "integrity check" failures that will have been logged. Thus, based upon the present invention, a hacker is unable to reverse-engineer the software without being detected.

Forward security is achieved by dynamically evolving the information that goes into the log. For example, a random number is chosen as a key in the beginning of the execution and then this key is used to record an entry into the log. This key evolves using a one-way function to be a new key, and the old key is then erased (overwritten). Next time, the new key will be used to record the information in the log. The key can be used to generate the information, to decide what information to record, to encrypt the record, or for any other usage. Thus, the entries going into the log are a function of the key that evolves using a one-way function. For example, at time t, the hacker discovers that his/her behavior is being recorded into the log, but he/she has no way to go back to figure out the previous keys (before time t) in order to forge the information already recorded in the log to try to make the log look correct.

The log will be periodically connected and transmitted back to the clearinghouse (a clearinghouse is an entity that periodically receives logs, checks logs to determine if tampering has occurred by comparing log content to proper log content). At the same time, while the software is recording what happens with the code execution, the same initial random number (key) evolves in a synchronized way in the clearinghouse. The clearinghouse knows the exact information that should have gone into the log. The verification/detection process happening in the clearinghouse can then be a simple comparison between the returned log and the right information that the clearinghouse has computed using the same evolving key—which continues to evolve from connection to connection. If the untrusted user substitutes an old valid log, the keys will not be correct. If the user submits a truncated log, then the next time the log is transmitted, the keys will not be correct. The first time an anomaly is detected in the log, the clearinghouse can raise an alert to the administrator. The administrator can pay more attention to the same user the next time or choose to give a warning to the user. When "enough" tamper evidence is accumulated (for example, exceeds a threshold), the user can be disconnected from the network and disallowed to receive new content distribution in the future.

Basic steps involved in the scheme:

(1) Decide where to perform an integrity check and what types of integrity checks are needed. All types of integrity checks are within the scope. For example, testing a checksum on a block of code might be one of the integrity checks.

(2) Decide on a one-way function, such as C2_G, MD5, or RSA. C2_G (Cryptomeria one-way function) is a one-way function used in the well-known content protection scheme called CPRM. MD5 (Message Digest #5) is a one-way function commonly used as a cryptographic hash in digital signature operations. RSA is the class public key encryption algorithm. The RSA encryption algorithm acts as a one-way function to anyone who does not contain the associated private key.

(3) Embed integrity check information into the code to be protected, such that log entries are generated at the points determined in step (1) and the key is evolved using the one-way function when that occurs.

(4) Transmit the log back to the clearinghouse, and the clearinghouse will verify the log and detect the tampering process or determine if no tampering has occurred.

FIG. 1 illustrates a general method wherein the key progression is independent of log entry value. The size of the log is unbounded. A one-way function f1 is used to evolve keys f1(k_i)→k_i+1 independent of the integrity check value v_i. Another f2 function uses the key on the integrity check value v_i to generate the log entry. Function f2 might be the encryption of the key k_i with value v_i, for example, but other f2 functions could be substituted thereof. Because the key evolves using a one-way function, at time t when a hacker succeeds with the tampering and gets the current key k_i, the hacker still has no way to know the previous keys k_0 . . . k_(i-1). Therefore, the hacker cannot go back to forge any log entry already recorded. When the log entries are transmitted back to the clearinghouse, the clearinghouse can repeat the f2 computation and verify if the log entries are correct in both senses: that they are correctly encrypted, and that the integrity checks values indicate that no tampering has occurred. Because the hacking process fails in some integrity check value v_i, the log entry will be incorrect and can be detected by the clearinghouse.

Within the basic method of this invention (as described above), there are two different embodiments associated with steps (3)-(4). A brief description of each of the two embodiments is provided below.

Figure 2:
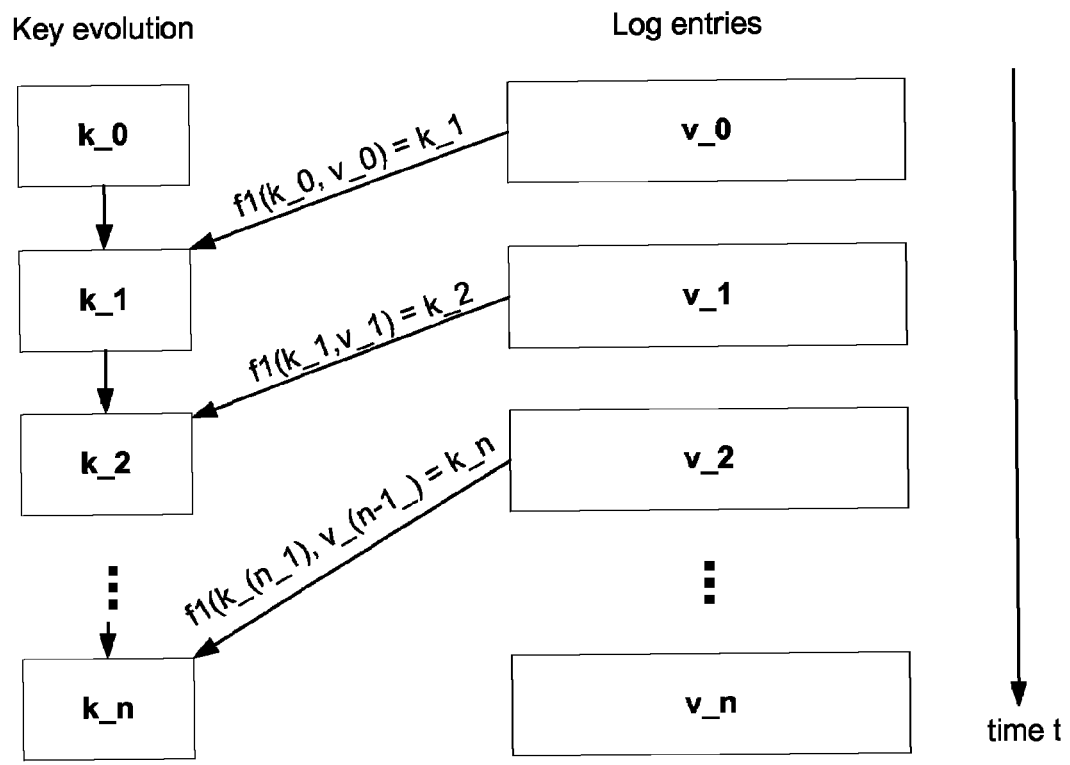
FIG. 2 illustrates one embodiment of the present invention's method wherein the key progression uses the log entry value.

Embodiment A: FIG. 2 illustrates the present invention's method wherein the key progression uses the log entry value. In this schema, a one-way function uses both current key k_i and the current integrity check value v_i to generate a new key k_(i+1). In the log, only current integrity check values v_i are entered. The log entries, together with the last key obtained k_n, are transmitted back to the clearinghouse. When software is hacked and the hacker tampers with some integrity check value v_i, the key evolution is erroneous. Therefore, the clearinghouse can use k_0 and the log entry values v_0 . . . v_n to evolve the keys and detect the tampering process. First, it verifies that the returned k_n can indeed be obtained using the observed log entries v_i. This is to determine that the hacker has not tampered with any of the v_i values in the log. Then, the clearinghouse checks the actual v_i values to see if there is any evidence of tampering during software execution.

The hacker can later learn the right integrity check value v_i that should have been stored; unfortunately for the hacker, it is of no help. Firstly, the function f is on both k and v. When the hacker first fumbles, it is because he/she fails the integrity check and gets the wrong integrity check value v. When the hacker finally succeeds at hacking and figures out the right integrity check value v during his/her hacking process, the hacker only knows the current key k_n and cannot know the previous keys k_0 . . . k_(n-1), and the hacker still has no way to know what the correct k_n value should have been. Therefore, the clearinghouse can always detect the hacking process. Secondly, if the hacker tries to restore all the correct integrity check values v_i into the log, then the clearinghouse would know that the hacker is trying to forge the log because the value k_n would not be consistent with the observed v_i.

Thus, embodiment A allows for the actual log to be in the clear (only current integrity check values, v_i, are entered). This aspect could be advantageously exploited in certain applications.

Figure 3:
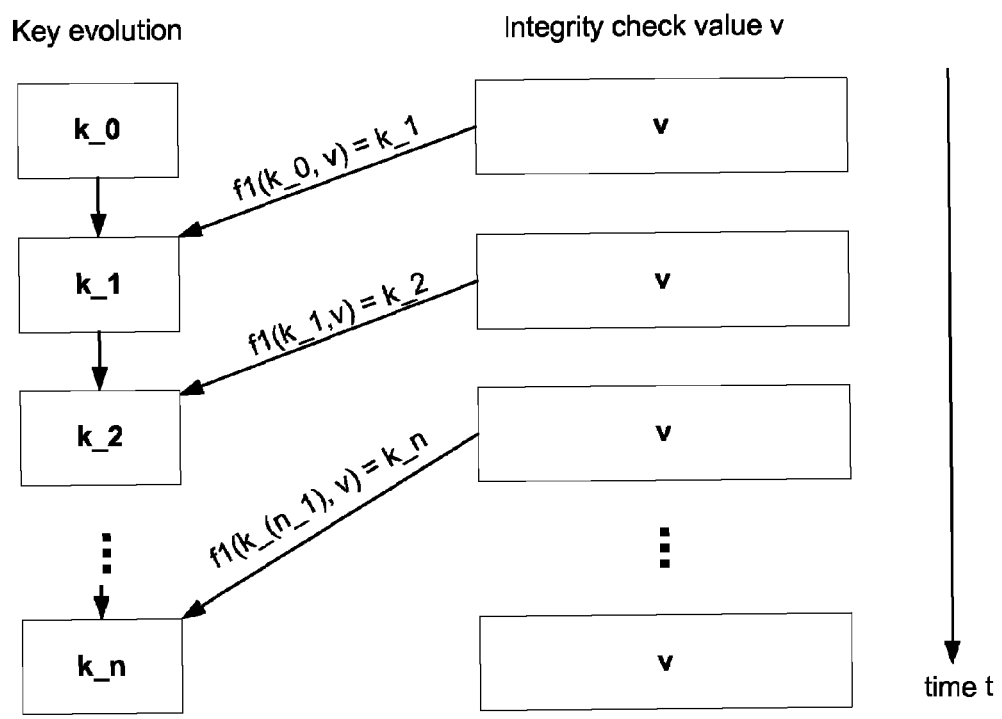
FIG. 3 illustrates a single key embodiment of the present invention.

Embodiment B: FIG. 3 illustrates the single key embodiment of the present invention. The previous embodiment needs to transmit the entire log back to the clearinghouse. The log itself can become very large over time. This embodiment B is a variation of the general method of FIG. 1 and is aimed at reducing the size of the log. During the integrity check, the integrity check value can be made a fixed default value, v, whenever the check succeeds. In other words, only when the integrity check fails, will the check value be a different value other than v. In this case, the final k_n and the length of the log, N, are the only values that need to be stored and transmitted back to clearinghouse because a correct log is simply a sequence of N values v. The clearinghouse can perform the key calculation using function f and to verify if k_n is correct. If all integrity checks during software execution succeed, the final k_n must be correct. If any integrity check fails during execution, the integrity check value is different from v, and the key evolution process is erroneous (i.e., the right value can never be generated again as f is a one-way function).

To reduce the verification calculation process occurring in the clearinghouse, a one-way function f is chosen such that any valid key values k_i share a common property, and are different from invalid key values. Then, the clearinghouse needs to only verify if that property holds. It does not need to perform the key evolution process again. For example, if the one way function is an RSA-like calculation and v=1:

$$k_i = (vk_{i-1})^3 \bmod pq \text{ (p and q are big prime numbers)}$$

Then the clearinghouse can verify that $$k = k_0^{3n} \bmod pq$$

The hacker, or anyone else not knowing the factors p and q, cannot take a (3n)th root mod pq to move backwards in the key evolution, so the forward security property is maintained.

The key k_i needs to be stored in a non-volatile memory so that k evolution is not reset by the user powering off. It is also important that it be difficult for the end-user to restore a previous value, so simply storing k_i in a file is not usually sufficient. It should be noted that this invention is envisioned to be used in a content protection application, which has the exact same problem storing the content keys and the usage counts.

Another extension of this invention involves the use of wrapping when the log has a fixed size and a situation arises when the fixed size is exceeded. Embodiment B is the extreme of this (embodiment B can be thought of as a log of size 1). In the general method of FIG. 1, if a log has a fixed length N, everything still works fine as long as the clearinghouse knows the total number of log entries that have been recorded, even if some have been lost due to wrapping. Using the total number, the clearinghouse can calculate the key evolution and read the last N entries. It should be noted that previous entries will have been overwritten, but that is unavoidable when there is a fixed-length log. Embodiment A, however, needs a little more help if the log is of fixed length. The clearinghouse, if it has lost some log entries because they have been overwritten, will not be able to calculate the key evolution and read the last N values.

Accordingly, the present invention uses integrity checks to detect an ongoing hacking process during software execution by recording the "integrity check" into the log. The disclosed method combines the "integrity check" and "forward security" into one working scheme and applies this scheme to proactively detect hackers tampering with software in such a way that the hacking process cannot go undetected.

Figure 4:
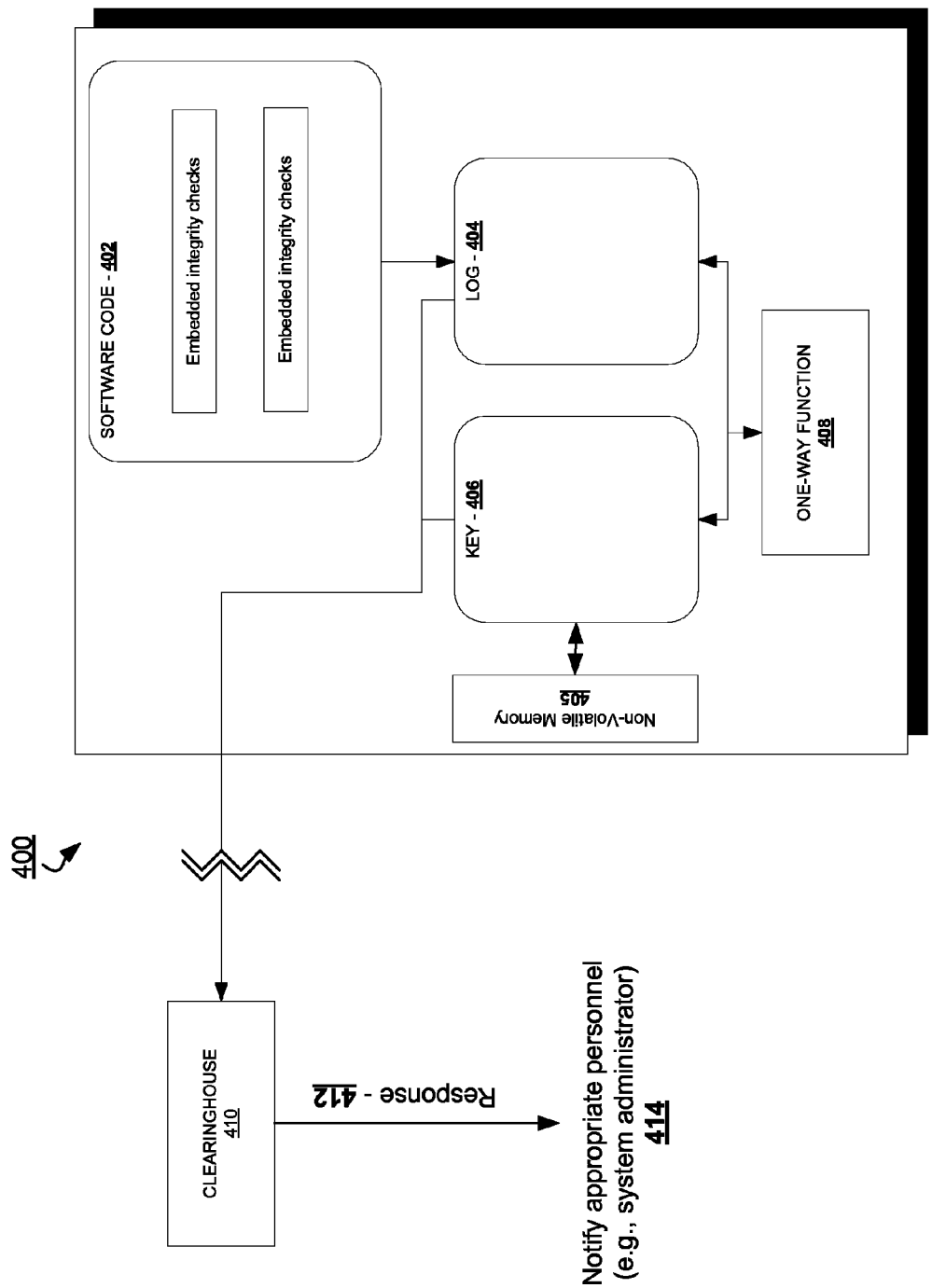
FIG. 4 illustrates an overview of a system implementing the embodiments disclosed in FIGS. 2 and 3.

FIG. 4 illustrates an overview of system 400 implementing the above-mentioned embodiments (A and B) of the present invention. Block 402 represents a block of software code with embedded integrity checks. As mentioned above, various integrity checks are envisioned. For example, an integrity check could be testing a checksum on a block of software code 402. Blocks 404 and 406 represents the audit log and evolving keys values respectively. A one-way function 408 is used to evolve the key values 406, wherein the one-way function depends on both the previous log entry (in audit log 404) and the previous key. In a specific embodiment, the key values are stored in non-volatile memory 405. The values in the audit log and the final key value are transmitted to clearinghouse 410, which then analyzes these values (by reproducing a series of key values using the one-way function and comparing the series with keys factored into the log entries in 404) to detect software intrusion. Lastly, if the clearing house detects software intrusion, a response 412 is sent to appropriate personnel 414, such as a system administrator. It should be noted that the location where key evolution takes place should not be used to restrict the scope of the present invention. For example, the above-mentioned key evolution scheme can be implemented in the clearinghouse 410.

Additionally, the present invention provides for an article of manufacture comprising computer readable program code contained within implementing one or more modules for robustly optimizing Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: (a) generating log entries in the audit log; (b) evolving key values based upon a one-way function wherein the one-way function depends both on the previous log entry and the previous key; and (c) aiding in the transmission of the audit log with the generated log entries and a final key value to a clearinghouse that detects software intrusion by analyzing said log entries and said final key value.

CONCLUSION

A system and method has been shown in the above embodiments for the effective implementation of a system and method to proactively detect software tampering. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by type of software code, type of integrity check, type of one-way function, or computing environment.

The above enhancements are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art security/encryption programming.

The invention claimed is:

1. A computer-based system to proactively detecting software intrusion using a dynamically evolving audit log, said computer-based system comprising:
   a. non-volatile memory storing at least:
      i. an audit log comprising a plurality of log entries representing integrity check results based upon software executions;
      ii. evolving key values based upon a one-way function, said one way function depending on both a previous log entry and a previous key; and;
   b. a network interface to transmit said audit log with said generated log entries and a final key value to a clearinghouse that detects software intrusion in client side software by analyzing said log entries and said final key value.

2. The computer-based system of claim 1, wherein said integrity check includes a checksum computation on a section of software code.

3. The computer-based system of claim 1, wherein said log entries are identical in value.

4. The computer-based system of claim 1, wherein said audit log is limited in size whereby said log entries form an audit log that wraps around.

5. The computer-based system of claim 1, wherein previous keys in said non-volatile memory are deleted after creation of next key value.

6. The computer-based system of claim 1, wherein said step of evolving keys is performed independently by said clearinghouse.

7. The computer-based system of claim 1, wherein analysis by said clearinghouse includes reproducing a series of key values using said one-way function and comparing said series with keys factored into said log entries.

8. The computer-based system of claim 1, wherein said keys have mathematically distinctive properties.

9. The computer-based system of claim 1, wherein said network interface periodically transmits said audit log stored in non-volatile memory.

10. The computer-based system of claim 1, wherein said network interface transmits said audit log stored in non-volatile memory during software code execution.

11. A computer-based system to proactively detect software intrusion using a dynamically evolving audit log, said system comprising:
    a. computer readable program code executed in a computer to embed integrity checks in software code;
    b. non-volatile memory storing at least an audit log comprising computer generated log entries with an identical log entry value and evolving key values based upon a one-way function, said one way function depending on both said identical log entry value and previous key; and c. a network interface to transmit said identical log entry value and final key value to a clearinghouse that detects software intrusion by analyzing said identical log entry value and final key value.

12. The computer-based system of claim 11, wherein said software code can include: web browser, sound card driver, game console program, Java applet, macro embedded in other digital content.

13. The computer-based system of claim 11, wherein said digital content comprises any of the following: image, music, video, or database files.

14. The computer-based system of claim 11, wherein said system responds to detected tampering via any of, or a combination of, the following ways: disconnecting software code user, revoking software code user's device keys, refusing requests for additional content from software code user, increasing number and variety of types of integrity checks in software code or content sent to user, increasing frequency of periodic transmission of said audit log and final key, and advising a system administrator regarding said detected tampering.

15. The computer-based system of claim 11, wherein said audit log in said non-volatile memory is limited in size whereby said log entries form an audit log that wraps around.

16. The computer-based system of claim 11, wherein previous keys in said non-volatile memory are deleted after creation of next key value.

17. The computer-based system of claim 11, wherein analysis by said clearinghouse includes reproducing a series of key values using said one-way function and comparing said series with keys factored into said log entries.

18. The computer-based system of claim 11, wherein said keys have mathematically distinctive properties.

19. The computer-based system of claim 11, wherein said network interface periodically transmits said audit log stored in non-volatile memory.

20. The computer-based system of claim 11, wherein said network interface transmits said audit log stored in non-volatile memory during software code execution.

* * * * *